United States Patent
Stovall et al.

(10) Patent No.: US 7,506,888 B1
(45) Date of Patent: Mar. 24, 2009

(54) SAFETY LATCH SYSTEM FOR TOWING DOLLIES

(76) Inventors: Derome Stovall, 22679 Frederick Rd., Steger, IL (US) 60475; Erica King, 22679 Frederick Rd., Steger, IL (US) 60475

( * ) Notice: Subject to any disclaimer, the term of this patent is extended or adjusted under 35 U.S.C. 154(b) by 527 days.

(21) Appl. No.: 11/400,819

(22) Filed: Apr. 10, 2006

(51) Int. Cl.
*B60D 1/14* (2006.01)
*B62D 53/06* (2006.01)

(52) U.S. Cl. .................... 280/491.5; 280/149.2

(58) Field of Classification Search ........... 280/493, 280/495, 496, 491.5, 504, 507, 149.2; 298/38; 292/256.5
See application file for complete search history.

(56) References Cited

U.S. PATENT DOCUMENTS

| | | | | |
|---|---|---|---|---|
| 2,850,293 | A * | 9/1958 | Hall .................. | 280/491.5 |
| 2,976,060 | A * | 3/1961 | Barden ................ | 280/491.5 |
| 3,061,334 | A * | 10/1962 | Everett et al. ........ | 280/513 |
| 3,128,107 | A | 4/1964 | Miller et al. | |
| 3,716,255 | A * | 2/1973 | Morris ................ | 280/491.5 |
| 4,169,579 | A * | 10/1979 | Moll .................. | 254/45 |
| 4,320,907 | A * | 3/1982 | Eaton ................. | 280/511 |
| 4,487,284 | A * | 12/1984 | Steiner ............... | 180/219 |
| 4,620,736 | A * | 11/1986 | Shanks ................ | 239/116 |
| 5,039,272 | A | 8/1991 | Holmes et al. | |
| 5,362,084 | A | 11/1994 | Edwards | |
| D388,384 | S | 12/1997 | Williams | |
| 5,918,896 | A | 7/1999 | Jenkins, Jr. | |
| 6,279,939 | B1 | 8/2001 | Austin | |
| 2006/0097508 | A1* | 5/2006 | Bachman et al. ....... | 280/837 |

* cited by examiner

*Primary Examiner*—Paul N. Dickson
*Assistant Examiner*—Daniel Yeagley
(74) *Attorney, Agent, or Firm*—Crossley Patent Law; Mark A Crossley

(57) ABSTRACT

A safety latch system for towing dollies has a frame that is comprised of front, rear, right, left, and internal frame members. A hitch point on the front frame is used to attach to the tow vehicle. Cable and cylinder ports are on, and extend through the front frame. The cable has two ends, and can have end loops, where the first loop encloses a handle and the second loop is connected to an engagement device. A spring-loaded cylinder has a first end attached to the cable, and a second end with a pin that extends through the cylinder port. The hitch point can be two pieces with a tow bar member attached to the front frame and a towing hitch that slides into the tow bar member. The cable can route through a cable retention member attached to the internal frame, and can also be plastic coated. The engagement device can be a S-hook, a coupling link, a twin clevis, a carabineer, a connecting link or an eyehook.

20 Claims, 1 Drawing Sheet

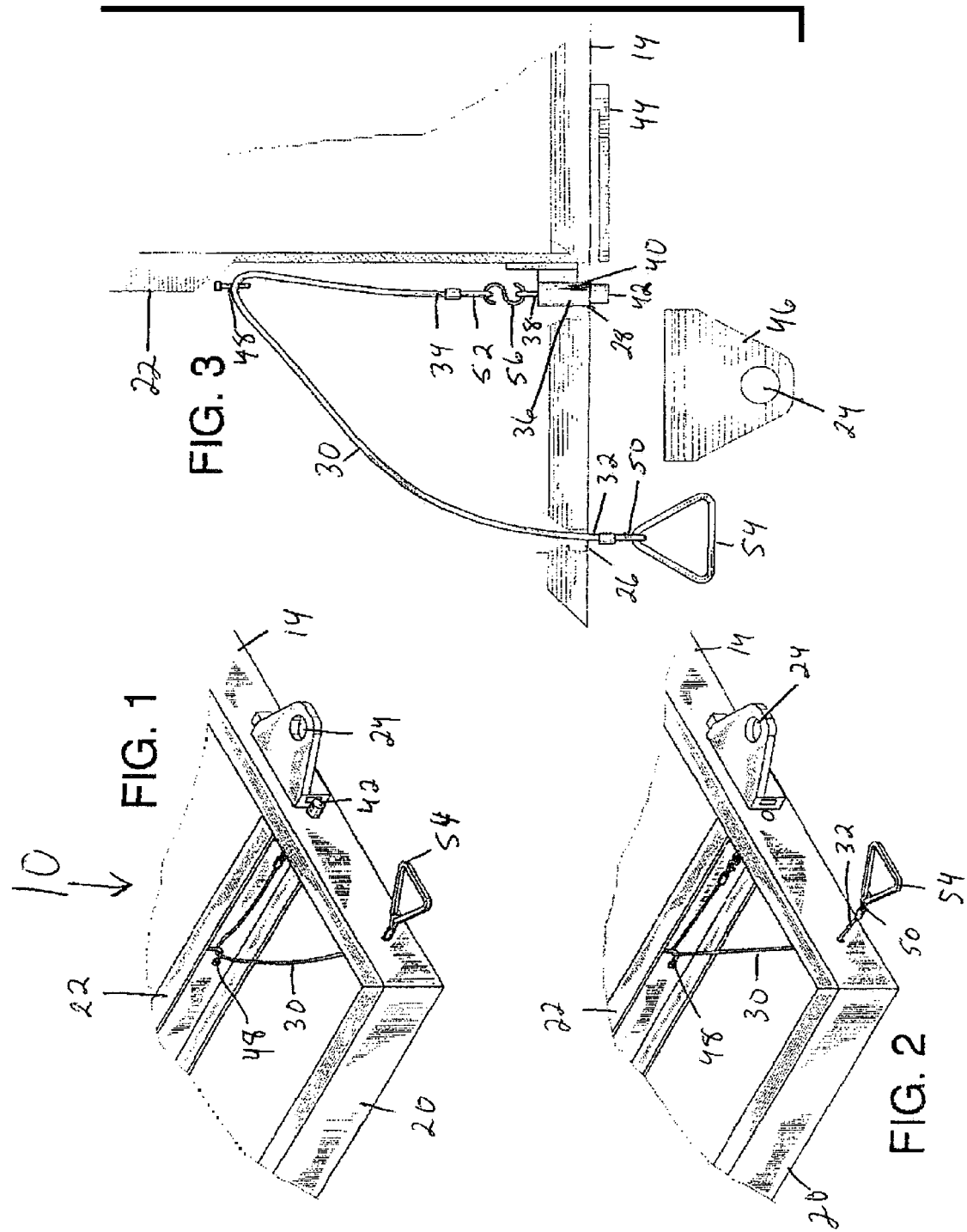

SAFETY LATCH SYSTEM FOR TOWING DOLLIES

BACKGROUND OF THE INVENTION

Many offerings exist by which safety of towed vehicles is increased. The devices offered, however, do not solve all problems associated with shifting and loss of tow vehicle connection. When the dolly shifts, either due to weight shift or operator movement, then the dolly can become unbalanced. When the dolly becomes unstable or unbalanced, then people nearby or the operator can be placed in danger of the load falling on them or becoming trapped by the load or the dolly.

FIELD OF THE INVENTION

The present invention relates to a safety latch system for towing dollies for use in connection with safely moving towed vehicles. The safety latch system for towing dollies has particular utility in connection with increasing safety by limiting tow bar movement.

DESCRIPTION OF THE PRIOR ART

The use of trailer safety devices is known in the prior art. For example, U.S. Pat. No. 5,918,896 to Jenkins, Jr. discloses a self-locking chain device. However, the Jenkins, Jr. '896 patent prevents disconnection of the towed vehicle from the towing vehicle, and does not prevent lateral movement. Additionally the Jenkins, Jr. '896 patent does not have the pull release of the safety device of the present invention.

U.S. Pat. No. 6,279,939 to Austin discloses a trailer safety chain assembly that prevents disconnection of the towed vehicle from the towing vehicle, and prevents the trailer tongue from dropping if disconnected. However, the Austin '939 patent does not prevent lateral movement, and additionally does not have the pull release of the safety device of the present invention.

While the above-described devices fulfill their respective and particular objects and requirements, they do not describe a safety latch system for towing dollies that provides for the advantages of the present invention; therefore, a need exists for an improved safety latch system for towing dollies, particularly one that includes lateral movement control and a pull release of the safety device.

In this respect, the present invention substantially departs from the conventional concepts and designs of the prior art.

SUMMARY OF THE INVENTION

In view of the foregoing disadvantages inherent in the known types of safety devices now present in the prior art, the present invention provides an improved safety latch system for towing dollies, and overcomes the above-mentioned disadvantages and drawbacks of the prior art. As such, the general purpose of the present invention, which will be described subsequently in greater detail, is to provide a new and improved safety latch system for towing dollies which has all the advantages of the prior art mentioned heretofore and many novel features that result in a safety latch system for towing dollies which is not anticipated, rendered obvious, suggested, or even implied by the prior art, either alone or in any combination thereof.

To attain this, the present invention essentially comprises a safety latch system for towing dollies with a towed vehicle frame having a front, a rear, a right, a left, and internal frame members. There is a hitch point on the front frame member. A cable and cylinder ports are located on the front frame member and extend through the frame. A cable with opposite ends has the first end outside of the front frame member, and the second end passes through the cable port and is on the inside of the frame. There is a spring-loaded cylinder having a first end and a second end, the second end has a pin that extends through the cylinder port, and the first end is attached to the cable.

There are several other modifications discussed in the following paragraph. The hitch pint can be a two-piece unit that is a tow bar member attached to the front frame member and an L-shaped towing hitch with one arm that slides into the tow bar member and the other arm extends horizontally to allow the hitch to be attached. The cable could be routed through a cable retention member, or holder, attached to the internal frame, this will help to keep the cable supported and assists in directing the pull. The opposite ends of the cable can have a first and a second loop. The first loop of the cable could enclose a handle to make releasing the cylinder pin easier. The second loop of the cable can attach to an engagement means between the second loop and the spring-loaded cylinder. This engagement means can be an S-hook, a coupling link, a twin clevis, a carabineer, a connecting link or an eyehook.

There has thus been outlined, rather broadly, the more important features of the invention in order that the detailed description thereof that follows may be better understood and in order that the present contribution to the art may be better appreciated.

The cable can be plastic coated or not, as desired by the end user, and chosen to suit the environment in which the tow vehicle is used. There are, of course, additional features of the invention that will be described hereinafter and which will form the subject matter of the claims attached.

It is therefor an object of the present invention to provide a new and improved safety latch system for towing dollies that has all of the advantages of the prior art safety devices and none of the disadvantages.

It is another object of the present invention to provide a new and improved safety latch system for towing dollies that may be easily and efficiently manufactured and marketed.

An even further object of the present invention is to provide a new and improved safety latch system for towing dollies that has a low cost of manufacture with regard to both materials and labor, and which accordingly is then susceptible of low prices of sale to the consuming public, thereby making such safety latch system for towing dollies economically available to the buying public.

Still another object of the present invention is to provide a new safety latch system for towing dollies that provides in the apparatuses and methods of the prior art some of the advantages thereof, while simultaneously overcoming some of the disadvantages normally associated therewith.

Even still another object of the present invention is to provide a safety latch system for towing dollies for preventing lateral movement of the dolly from off center. This allows the dolly to be moved more safely.

Still yet another object of the present invention is to provide a safety latch system for towing dollies for increasing safety. This makes it possible to prevent injuries.

Lastly, it is an object of the present invention to provide a new and improved safety latch system for towing dollies providing a quick and easy release capability of the safety mechanism.

Thus has been broadly outlined the more important features of the safety latch system for towing dollies so that the detailed description thereof that follows may be better understood and in order that the present contribution to the art may be better appreciated.

Numerous objects, features and advantages of the safety latch system for towing dollies will be readily apparent to those of ordinary skill in the art upon reading the following detailed description of presently preferred, but nonetheless illustrative, embodiments of the safety latch system for towing dollies when taken in conjunction with the accompanying drawings. In this respect, before explaining the current embodiments of the safety latch system for towing dollies in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the safety latch system for towing dollies. It is therefore important that the claims be regarded as including such equivalent constructions insofar as they do not depart from the spirit and scope of the present invention.

These together with additional objects of the safety latch system for towing dollies, along with various novel features that characterize the invention are particularly pointed out in the claims forming a part of this disclosure. For better understanding of the safety latch system for towing dollies, its operating advantages and specific objects attained by its uses, refer to the accompanying drawings and description.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGURES

FIG. 1 is a left perspective view of the preferred embodiment of the safety latch system for towing dollies constructed in accordance with the principles of the present invention, showing the safety latch system in the engaged position.

FIG. 2 is a left perspective view of the safety latch system for towing dollies, showing the safety latch system in the disengaged position, with the arrows designating the relative movements of the handle and pin.

FIG. 3 is a top cut-away view of the safety latch system for towing dollies, with the slide on towing hitch disengaged from the slot of the tow bar member.

The same reference numbers refer to the same parts throughout the various figures.

| REFERENCE NUMERALS | |
|---|---|
| towed vehicle frame | 12 |
| front frame member | 14 |
| rear frame member | 16 |
| right frame member | 18 |

| REFERENCE NUMERALS -continued | |
|---|---|
| left frame member | 20 |
| internal frame member | 22 |
| hitch point | 24 |
| cable port | 26 |
| cylinder port | 28 |
| cable | 30 |
| cable first end | 32 |
| cable second opposite end | 34 |
| spring loaded cylinder | 36 |
| first cylinder end | 38 |
| second cylinder end | 40 |
| pin | 42 |
| tow bar member | 44 |
| towing hitch | 46 |
| cable retention member | 48 |
| first cable loop | 50 |
| second cable loop | 52 |
| handle | 54 |
| engagement means | 56 |

DETAILED DESCRIPTION OF THE PREFERRED EMBODIMENT

Referring now to the drawings, a preferred embodiment of the safety latch system for towing dollies of the present invention is shown and generally designated by the reference numeral 10.

In FIG. 1, a new and improved safety latch system for towing dollies 10 of the present invention for improved towed vehicle safety is illustrated and will be described. More particularly, the safety latch system for towing dollies 10 has a towed vehicle frame 12 having a front frame member 14, a rear frame member 16, a right frame member 18, a left frame member 20, and an internal frame member 22. Only the front frame member 14, left frame member 20, and internal frame member 22 can be seen in the Figures. There is a hitch point 24 on the front frame member 14. The hitch point 24 can be a tow bar member 44 attached to the front frame member and a towing hitch 46 that slides in and engages the tow bar member 44. The front frame member 14 has a cable port 26 and a cylinder port 28 that extend through the front frame member 14. The cable 30 has a first end 32, and a second opposite end 34, the first end 32 is outside of the front frame member 14 and the second end 34 passes through the cable port 26 and is inside of the front frame member 14. The spring-loaded cylinder 36 has a first end 38, and a second end 40, and the first cylinder end 38 is attached to the cable second end 34. The second cylinder end 40 has a pin 42, and the pin 42 extends through the cylinder port 28. The cable 30 routes through a cable retention member 48 attached to the internal frame member 22. The opposite ends of the cable 30 have a first 50 and a second loop 52. The first loop 50 encloses a handle 54, and the second loop 52 is connected to an engagement means 56.

FIG. 2 is a left perspective view of the safety latch system for towing dollies, showing the safety latch system in the disengaged position, with the arrows designating the relative movements of the handle 54 and the pin 42. The front frame member 14, left frame member 20, and internal frame member 22 can be seen. There is a hitch point 24 on the front frame member 14. The front frame member 14 has a cable port 26 and a cylinder port 28 that extend through the front frame member 14. The cable 30 has a first end 32, and a second opposite end 34, the first end 32 is outside of the front frame member 14 and the second end 34 passing through the cable port 26 and is inside of the front frame member 14. The cable 30 can be routed through a cable retention member 48 attached to the internal frame member 22. The spring-loaded cylinder 36 has a first end 38, and a second end 40, and the first cylinder end 38 is attached to the cable second end 34. The second cylinder end 40 has a pin 42, and the pin 42 extends through the cylinder port 26. The opposite ends of the cable 30 have a first 50 and a second loop 52. The first loop 50 encloses a handle 54, and the second loop 52 is connected to an engagement means 56. The hitch point 24 can be a tow bar member 44 attached to the front frame member and a towing hitch 46 that slides in and engages the tow bar member 44. The engagement means 56 is shown as an s-hook, but can be any of a variety of common connectors. The loops 50 and 52 can be held in place with cable clamps or formed wire.

FIG. 3 is a top cut-away view of the safety latch system for towing dollies, with the towing hitch 46 disengaged from the tow bar member 44. The front frame member 14, left frame member 20, and internal frame member 22 can be seen. There is a hitch point 24 on the front frame member 14. The front frame member 14 has a cable port 26 and a cylinder port 38 that extend through the front frame member 14. The cable 30 has a first end 32, and a second opposite end 34. The first end 32 is outside of the front frame member 14 and the second end 34 passes through the cable port 26 and is inside of the front frame member 14. The cable 30 can be routed through a cable retention member 48 attached to the internal frame member 22. The spring-loaded cylinder 36 has a first end 38, and a second end 40, and the first cylinder end 38 is attached to the cable second end 34. The second cylinder end 40 has a pin 42, and the pin 42 extends through the cylinder port 28. The opposite ends 32 and 34 of the cable 30, have a corresponding first loop 50 and second loop 52. The first loop 50 encloses a handle 54, and the second loop 52 is connected to an engagement means 56. The hitch point 24 can be a tow bar member 44 attached to the front frame member and a towing hitch 46 that slides in and engages the tow bar member 44. The engagement means 56 is shown as an s-hook, but can be any of a variety of common connectors. The loops 50 and 52 can be held in place with cable clamps or formed wire.

A safety latch system for towing dollies with a typical towed vehicle frame having a front, rear, right, left, and internal frame members. There is a hitch point on the front frame member, which can be a tow bar member attached to the front frame and a towing hitch that slides into and engages a slot formed between the tow bar member and the frame. The front frame member has cable and cylinder ports extending through the frame member. The cable has first and second opposite ends, the first end being external of the front frame member and the second end passing through the cable port and being internal of the front frame member. A spring-loaded cylinder has a first end and a second end, and the first end is attached to the cable and the second end has a pin that extends through the cylinder port. The cable routes through a cable retention member attached to the internal frame. The opposite ends of the cable can have a first and a second loop, where the first loop encloses a handle and the second loop is connected to an engagement means. The engagement means can be an S-hook, a coupling link, a twin clevis, a carabineer, a connecting link or an eyehook. The cable can be plastic coated.

The inventors conceived the present invention through working in an environment where dollies are used to move materials from one area to another. Accidents have occurred through the shifting of the towed dolly, with resultant injury to nearby people. The safety latch system for towing dollies was developed to reduce these types of injuries.

In use, it can now be understood that the safety latch system for towing dollies works to prevent lateral movement of the towed vehicle relative to the towing hitch. Through the prevention of lateral movement, safety is increased for both the tow operator and workers in the area when the vehicle is being towed and unhitched.

While a preferred embodiment of the safety latch system for towing dollies has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. And although towing dollies has been described, it should be appreciated that the safety latch system for towing dollies herein described is also suitable for providing safety to other vehicle types.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A safety latch system for towing dollies comprising:
   a towed vehicle frame having a front frame member, a rear frame member, a right frame member, a left frame member, and an internal frame member;
   a hitch point on said front frame member;
   a cable port on said front frame member and extending therethrough;
   a cylinder port on said front frame member and extending therethrough;
   a cable having a first and a second opposite ends, said first cable end being external of said front frame member and said second cable end passing through said cable port and being internal of said front frame member;
   a spring loaded cylinder having a first end and a second end, wherein said first cylinder end is attached to said cable second end and said second cylinder end having a pin, wherein said pin extends through said cylinder port.

2. The safety latch system for towing dollies of claim 1 wherein said hitch pint comprises a tow bar member attached to said front frame member and a slidably engaged towing hitch.

3. The safety latch system for towing dollies of claim 1 wherein said cable routes through a cable retention member attached to said internal frame member.

4. The safety latch system for towing dollies of claim 1 wherein said opposite ends of said cable have a first loop and a second loop.

5. The safety latch system for towing dollies of claim 4 wherein said first loop encloses a handle.

6. The safety latch system for towing dollies of claim 4 wherein said second loop is connected to an engagement means.

7. The safety latch system for towing dollies of claim 6 wherein said engagement means is an S-hook, a coupling link, a twin clevis, a carabineer, a connecting link or an eyehook.

8. The safety latch system for towing dollies of claim 1 wherein said cable is plastic coated.

9. A safety latch system for towing dollies comprising:
a towed vehicle frame having a front frame member, a rear frame member, a right frame member, a left frame member, and an internal frame mmember;
a hitch point of said front frame member;
a cable port on said front frame member and extending therethrough;
a cylinder port on said front frame member and extending therethrough;
a cable having a first and a second opposite ends, said first cable end being external of said front frame member and said second cable end passing through said cable port and being internal of said front frame member, wherein said opposite ends of said cable have a first loop and a second loop;
a spring loaded cylinder having a first end and a second end, wherein said first cylinder end is attached to said cable second end and said second cylinder end having a pin, wherein said pin extends through said cylinder port.

10. The safety latch system for towing dollies of claim 9 wherein said hitch point comprises a tow bar member attached to said front frame member and a slidably engaged towing hitch.

11. The safety latch system for towing dollies of claim 9 wherein said cable routes through a cable retention member attached to said internal frame member.

12. The safety latch system for towing dollies of claim 9 wherein said first loop encloses a handle.

13. The safety latch system for towing dollies of claim 9 wherein said second loop is connected to an engagement means.

14. The safety latch system for towing dollies of claim 13 wherein said engagement means is an S-hook, a coupling link, a twin clevis, a carabineer, a connecting link or an eyehook.

15. The safety latch system for towing dollies of claim 9 wherein said cable is plastic coated.

16. A safety latch system for towing dollies comprising:
a towed vehicle frame having a front frame member, a rear frame member, a right frame member, a left frame member, and an internal frame member;
a hitch point on said front frame member, wherein said hitch point comprises a tow bar member attached to said front frame member and a slidably engaged towing hitch;
a cable port on said front frame member and extending therethrough;
a cylinder port on said front frame member and extending therethrough;
a cable having a first and a second opposite ends, said first cable end being external of said front frame member and said second cable end passing through said cable port and being internal of said front frame member, wherein said opposite ends of said cable have a first loop and a second loop;
a spring loaded cylinder having a first end and a second end, wherein said firs cylinder end is attached to said cable second end and said second cylinder end having a pin, wherein said pin extends through said cylinder port.

17. The safety latch system for towing dollies of claim 16 wherein said cable routes through a cable retention member attached to said internal frame member.

18. The safety latch system for towing dollies of claim 16 wherein said first loop encloses a handle and said second loop is connected to an engagement means.

19. The safety latch system for dollies of claim 18 wherein said engagement means is an S-hook, a coupling link, a twin clevis, a carabineer, a connecting link or an eyehook.

20. The safety latch system for towing dollies of claim 16 wherein said cable is plastic coated.

* * * * *